(12) United States Patent
Stroud

(10) Patent No.: US 11,851,161 B1
(45) Date of Patent: Dec. 26, 2023

(54) SAFETY AND STABILITY DEVICE FOR AN AIRCRAFT

(71) Applicant: AeroLuxury LLC, West Plains, MO (US)

(72) Inventor: Douglas Dwayne Stroud, West Plains, MO (US)

(73) Assignee: AEROLUXURY LLC, West Plains, MO (US)

( * ) Notice: Subject to any disclaimer, the term of this patent is extended or adjusted under 35 U.S.C. 154(b) by 0 days.

(21) Appl. No.: 17/815,483

(22) Filed: Jul. 27, 2022

(51) Int. Cl.
*B64C 17/06* (2006.01)

(52) U.S. Cl.
CPC .................... *B64C 17/06* (2013.01)

(58) Field of Classification Search
CPC ....................................... B64C 17/06
See application file for complete search history.

(56) References Cited

U.S. PATENT DOCUMENTS

| 2010/0051754 A1* | 3/2010 | Davidson ................ B64C 39/06 244/23 C |
| 2010/0320333 A1* | 12/2010 | Martin .................. B64C 39/001 244/23 C |
| 2016/0362178 A1* | 12/2016 | Nam ....................... B64C 27/08 |

FOREIGN PATENT DOCUMENTS

CN 113086216 A * 7/2021

* cited by examiner

*Primary Examiner* — Richard G Davis
(74) *Attorney, Agent, or Firm* — Husch Blackwell LLP

(57) ABSTRACT

Systems and methods for a gyroscopic rotational wing for an aircraft are disclosed. In one embodiment, a safety and stability device for an aircraft comprises an inner ring, an outer ring that rotates relative to the inner ring, and a motor connected to the inner ring that drives rotation of the outer ring relative to the inner ring. In some embodiments, the safety and stability device rotates in a substantially horizontal plane and at a rotational speed sufficient to provide gyroscopic stability for the aircraft.

25 Claims, 6 Drawing Sheets

SAFETY AND STABILITY DEVICE FOR AN AIRCRAFT

FIELD

The present invention relates generally to flying aircrafts. More particularly, the present invention relates to systems and methods for using a spinning gyroscopic wing for aviation purposes.

BACKGROUND

Air travel is a common mode of transportation. However, commercial air travel can be uncomfortable, expensive, and inconvenient given the rigorous regulation on the airline industry and the relatively limited availability of flights between some locations. Additionally, aircrafts are operated by a limited number of people who qualify as licensed pilots because the learning curve to fly an aircraft is extremely steep, for example, steeper than driving an automobile. Still, air travel is an effective mode of travel because air travel typically represents the shortest path between Point A and Point B and because air travel can safely occur at much higher speeds than other modes of transportation (e.g., automobiles, rail, or walking).

While airline travel has increased the mobility of humans, better travel options are still desired. For example, a commercial flight may effectively fly a human thousands of miles, but the places where aircrafts can land is relatively limited. Indeed, not all travel destinations have a commercial airport, and even in towns that have an airport, the airport may not be located particularly close to a person's ultimate destination. Additionally, conventional air travel is typically limited to long-distance travel because air travel is not efficient or feasible for shorter distance travel.

In view of the above, there is a continuing, ongoing need for improved air travel systems and methods.

DETAILED DESCRIPTION

Figure 1:
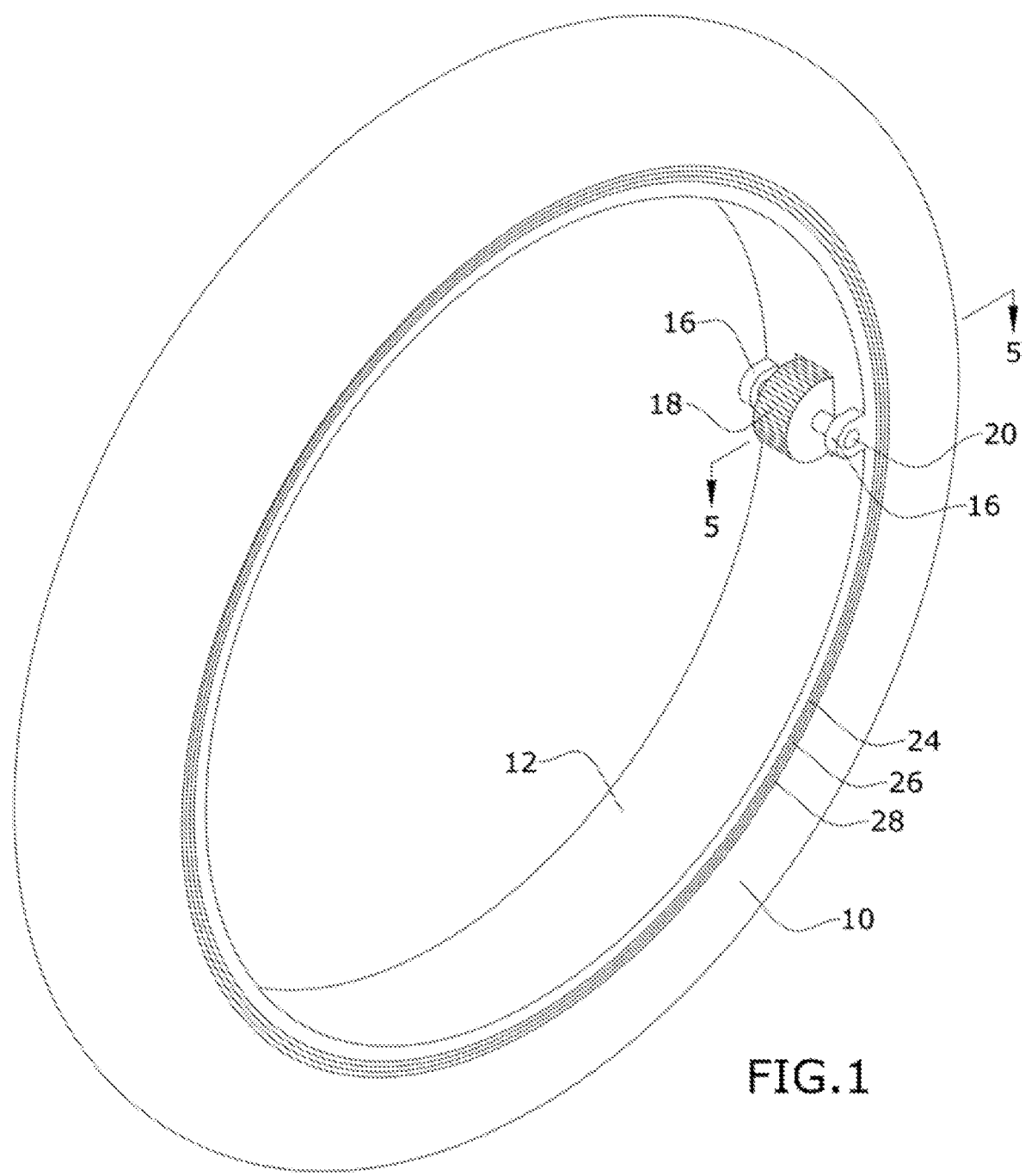
FIGS. 1-4 illustrate a safety and stability device for an aircraft, according to an exemplary embodiment.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include a safety and stability device used in aerospace or aviation. More particularly, the embodiments disclosed herein can include a safety and stability device rotating around a fuselage of an aircraft. The safety and stability device can rotate substantially horizontal to the ground while the aircraft is airborne. The safety and stability device can spin at a particular rate of speed such that the safety and stability device can operate as a gyroscope keeping the aircraft steady and level. Moreover, the safety and stability device can spin for aerodynamic purposes to cut through the air and decrease forward drag on the aircraft fuselage as the aircraft accelerates forward. In addition, the safety and stability device can protect the fuselage and cockpit from damage, such as if the aircraft were to hit a structure, such as buildings, trees, bridges, poles, or any other obstacle.

Due to the benefits described above, the safety and stability device described herein can allow for a personal aircraft or drone to be flown safely by more operators. The safety and stability device increases safety and also provides flight stability that will decrease the learning curve necessary for one to become an effective operator of the aircraft having the safety and stability device described herein. In one embodiment, a drone having the safety and stability device described herein can fly more safely and more stable than conventional drones. In another embodiment described herein, a personal aircraft having the safety and stability device described herein can allow for more air travel, even across shorter distances where conventional air travel would not have been efficient or feasible.

FIG. 1 illustrates a safety and stability device 100 according to an exemplary embodiment. The safety and stability device 100 can include an inner ring 12 and an outer ring 10 that rotates relative to the inner ring 12. The inner ring 12 may operate as a hub, and the inner ring 12 may connect to the outer ring 14 via a plurality of bearings 24, 26, 28, which can assist with the rotation of the outer ring 14. The safety and stability device 100 can include multiple bearings to meet redundancy requirements for flight set by aviation regulatory bodies, such as the Federal Aviation Administration (FAA). In the embodiment shown in FIGS. 1-6, the safety and stability device 100 can include three bearings, but more bearings can be included. Additionally, a safety and stability device 100 having a single bearing or two bearings is envisioned, should aviation regulations change. The plurality of bearings 24, 26, 28 may be ball, roller or plain bearings, but in a preferred embodiment, the bearings are plain bearings. In any embodiment, the plurality of bearings 24, 26, 28 can decrease the friction between the outer ring 14 and the inner ring 12 when the outer ring 14 rotates relative to the inner ring 12. The inner ring 12 may include a spool with two grooves, and the bearings 24, 26, 28 and the outer ring 14 may ride within the groove.

Figure 2:
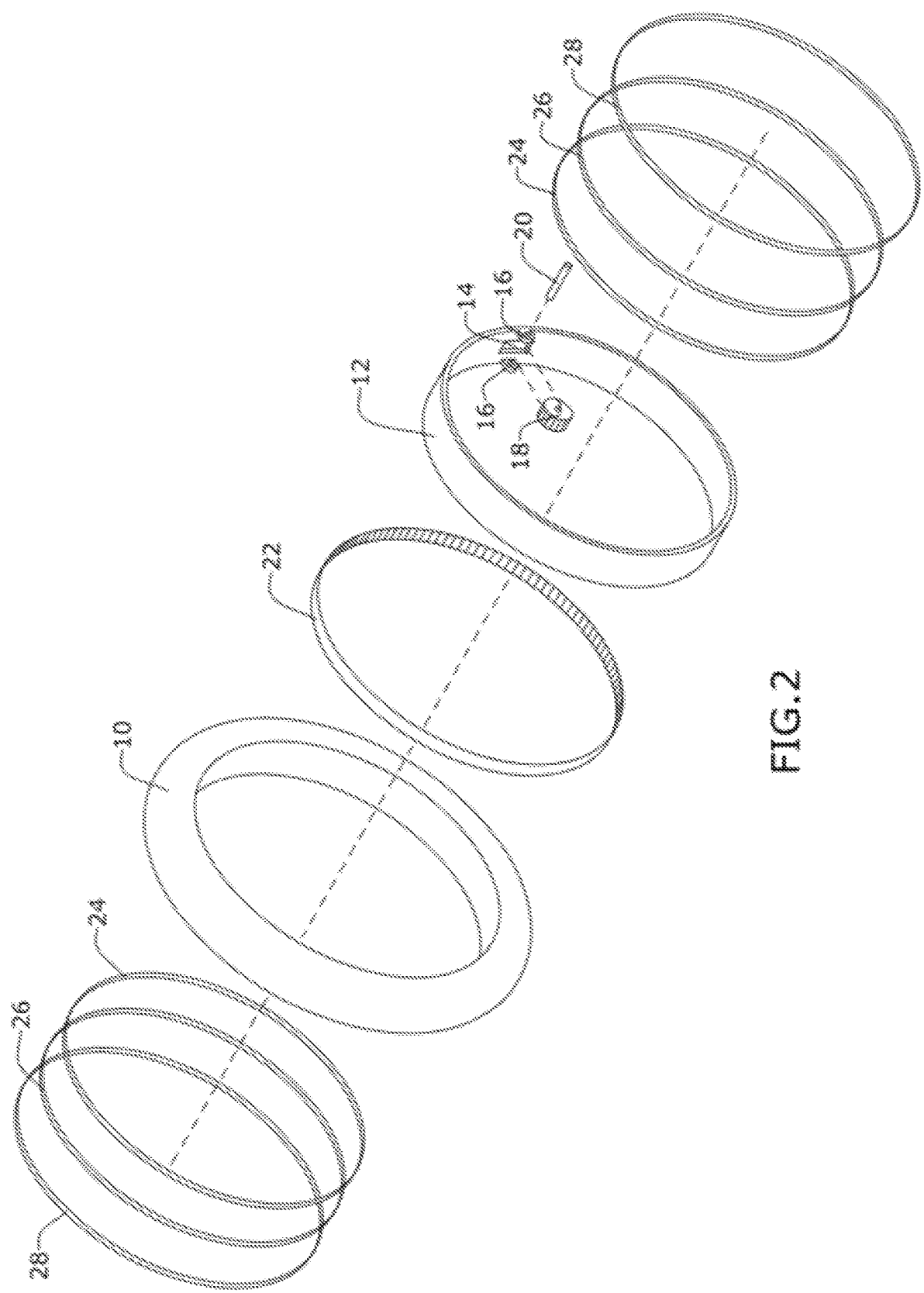

The outer ring 14 can connect to or include a geared ring 22, as shown in FIG. 2. The geared ring 22 can include teeth that can accept and engage with another gear. The geared ring 22 can drive the rotation of the outer ring 14 when another gear transmits rotational movement via torque and speed to the geared ring 22. Because the outer ring 14 connects to the geared ring 22, rotational movement of the geared ring 22 also causes rotational movement of the outer ring 14.

The inner ring 12 can further comprise a dual flange 16 formed on each side of the inner ring 12. The dual flange 16 can include holes for receiving and holding an axle 20. The axle 20 can extend across the dual flange 16 such that the axle 20 is held within each hole of the dual flange 16. In some embodiments, the axle 20 can act as a shaft for a motor 18. The motor 18 can extend through a hole 14 in the inner ring 12, and the motor 18 can engage the geared ring 22 through the hole 14. The motor 18 also can include gear teeth that engage and mesh with the geared ring 22. As a result, when the motor 18 turns, the gears of the motor 18 may engage with the geared ring 22, thereby causing the outer ring 10 to turn. The motor 18 can drive the safety and stability device 100 to very fast speeds and a high rotation per minute (RPM). With enough rotational speed, the safety and stability device 100 can generate gyroscopic stability for the safety and stability device 100 and any aircraft component formed inside the inner ring 12, such as a drone or a personal aircraft. Additionally, the safety and stability device 100 can act as a wing for the aircraft when rotated at a given speed.

The rotation speed of the safety and stability device 100 can vary depending on the translational speed of the aircraft. For example, at higher translational speeds, the rotational speed of the safety and stability device 100 can increase, whereas at lower translational speeds, the rotational speed of the safety and stability device 100 can decrease. The increased rotational speed at higher translational speed encourages stability of the aircraft. In some embodiments, the rotational speed of the safety and stability device 100 can have a direct relationship with the aircraft's translational speed. In another embodiment, the rotational speed of the safety and stability device 100 can have an exponential relationship with the aircraft's translational speed.

More accurately, the rotational speed of the safety and stability device 100 can vary depending on sensor readings that assist in keeping the aircraft fuselage straight and stable during flight. For example, the aircraft may include one or multiple gyroscope sensors to determine whether the aircraft is stable during flight. A processor can receive measurements from the gyroscope sensors, and the processor can adjust the rotational speed of the safety and security device 100 to balance the aircraft fuselage. It should be noted that rotating the safety and security device 100 changes the weight ratio of the entire aircraft. Those having skill in the art will know that flight requires a balance of both lift and aircraft weight as well as balancing thrust and drag. Because changes in rotational speed of the safety and security device 100 can change the weight ratio, then the amount of lift required for flight also changes and the aircraft may stabilize in view of the change in rotational speed by the safety and security device 100. The processor is programmed with various formulas and software to control the rotational speed of the safety and security device 100 in response to gyroscope sensor readings, thereby stabilizing the aircraft for flight.

Additionally, those skilled in the art with recognize that aircrafts having spinning objects for flight have "left-turning tendency", and the processor is further programmed to combat this known phenomenon. In any embodiment, the processor can control the rotational speed of the safety and stability device 100, and the safety and stability device 100 may comprise the processor. The processor can receive or measure the translational speed of the aircraft, and the processor can apply any formulas by referencing the formula or other relationship programmed into computer-readable memory, and the processor can further send signals to the motor 18 to increase or decrease the rotational speed of the safety and stability device 100 based on the gyroscope readings.

Rotating the safety and security device 100 can have additional benefits other than stability and safety. During translational movement, the nose of an airplane typically increases in heat due to an increase in translational speed due to air drag. The same would be true of the aircrafts disclosed herein, but because the forward most point of the aircrafts disclosed herein is the safety and security device 100, which rotates, the rotation of the safety and security device 100 can dissipate the generated heat across the entire safety and security device 100. This dissipation can decrease the heat load on the aircraft and also decrease the need for heat plates at a nose or front tip of an aircraft.

During takeoff, the safety and security device 100 can apply disk loading principals, by slowing ramping up the rotational movement of the safety and security device 100 to a stable rotational speed (e.g., 2500 RPM). The rotation of the safety and security device 100 can provide some lift, but not enough for takeoff or extended flight, so the aircrafts disclosed herein may have additional propellers or the like to provide extended flight. Additional propellers are particularly necessary for takeoff, which lifts dead weight even though the weight ratio of the aircraft changes due to the rotation of the safety and security device 100.

Figure 3:
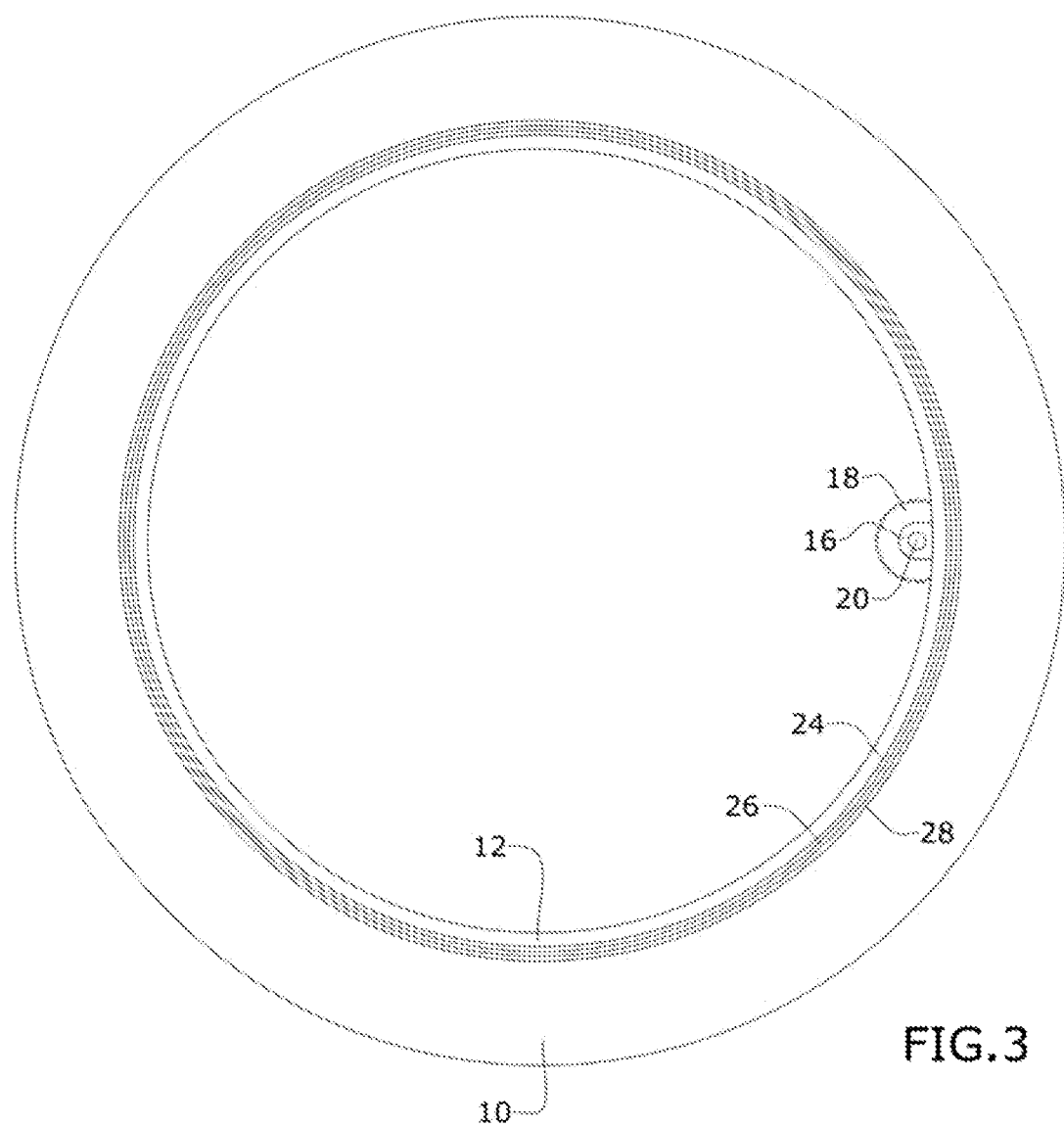
Figure 4:
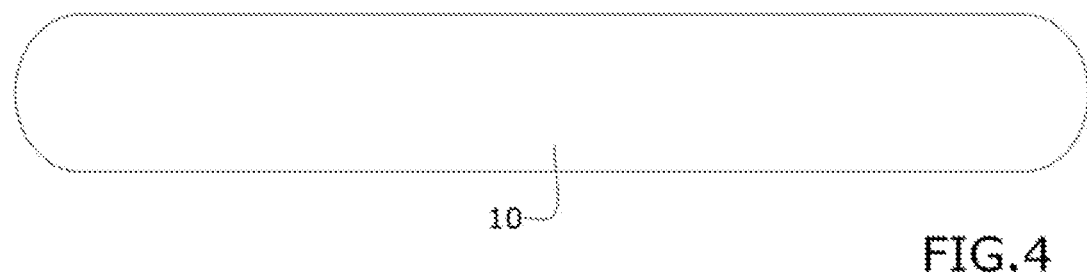

FIG. 3 illustrates the safety and stability device 100 from a side perspective, and FIG. 4 illustrates the safety and stability device from a top perspective. In some embodiments, the outer ring 10 may comprise a soft material such as rubber and may be filled with air, similar to a tire. Alternatively, the outer ring 10 may comprise any material that softens impact of the outer ring 14 with any solid structure that it strikes, and such material may comprise an air-filled polymer, polyethene foam, gels or any other soft material that reduces the impact of any forceful strike with a solid object.

Figure 5:
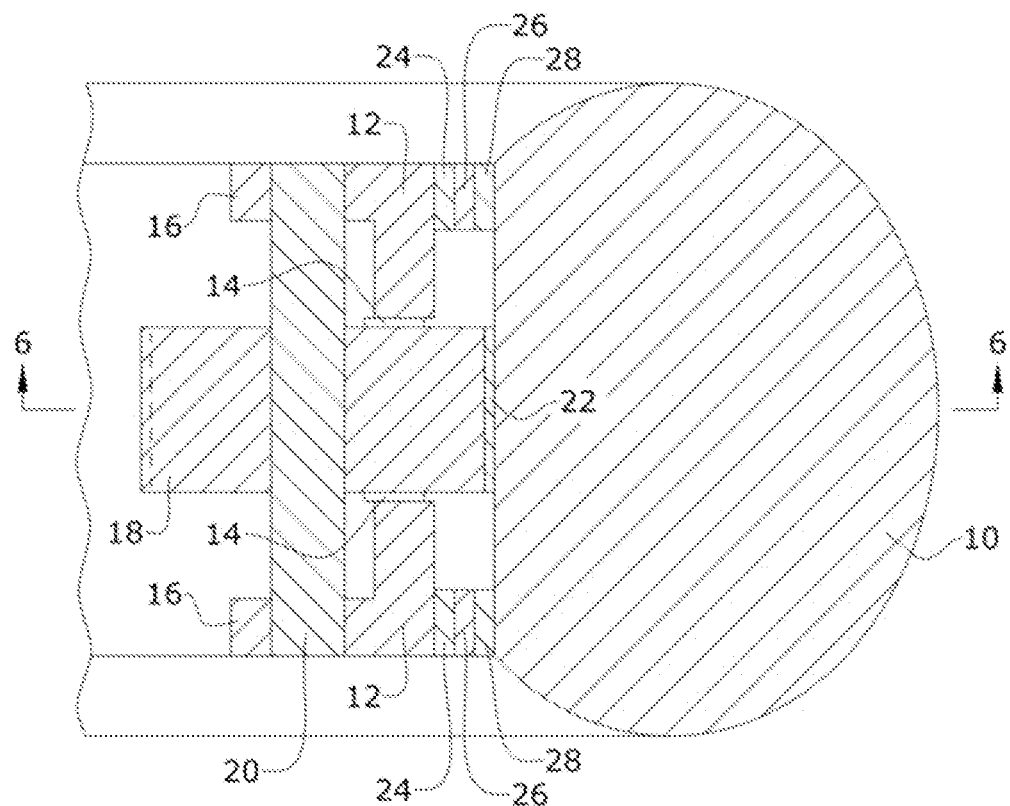
FIGS. 5-6 illustrate internal mechanisms for the safety and stability device, according to an exemplary embodiment.
Figure 6:
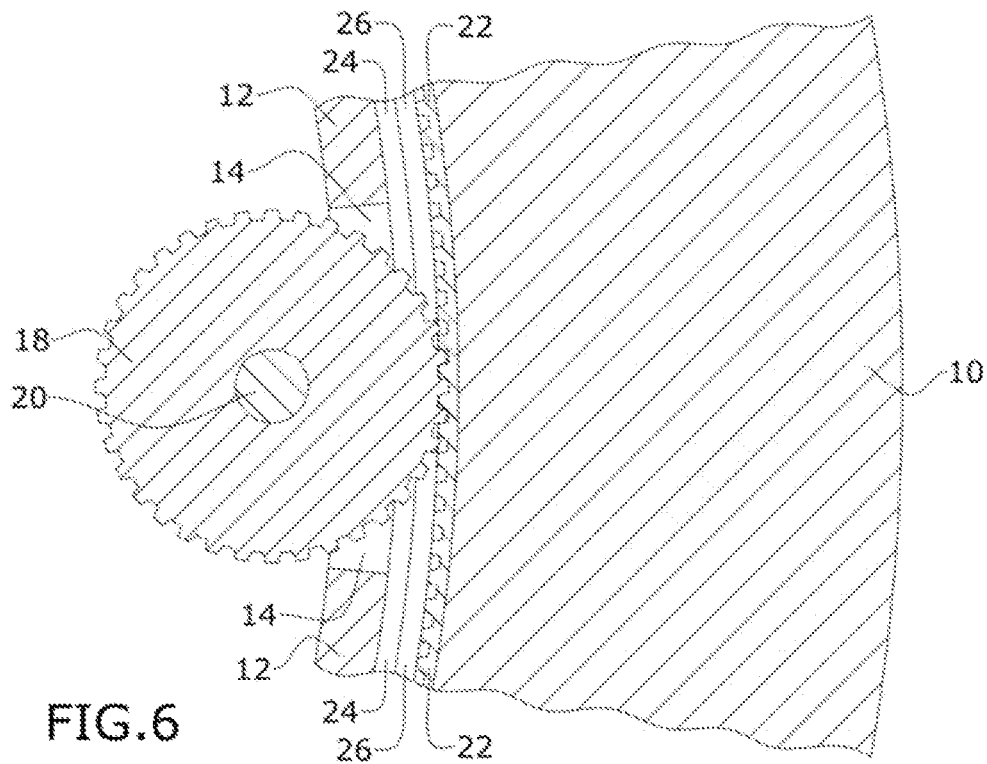

FIG. 5 illustrates the safety and stability device 100 at the cross section illustrated by line 5-5 in FIG. 1, and FIG. 6 illustrates the safety and stability device 100 at the cross section illustrated by line 6-6 in FIG. 5. FIGS. 5 and 6 better illustrate the interaction between the geared motor 18 and the geared ring 22 that causes rotation of the outer ring 14.

Importantly, the safety and stability device 100 rotates in a substantially horizontal plane. Because the safety and stability device 100 rotates horizontally, the safety and stability device 100 provides gyroscopic stability that stabilizes the safety and stability device 100 and anything connected to the safety and stability device 100 within the circular area created by the inner ring 12. Moreover, the horizonal rotation of the safety and stability device 100 provides protection of the aircraft fuselage at all sides of the aircraft. That is, the safety and stability device can protect the aircraft should the aircraft strike any structure during translational movement.

Notably, the safety and stability device 100 lacks a hub within the circular inner area created by the inner ring 12. The safety and stability device 100 lacks a hub so that additional aviation equipment may exist within and connect to the safety and stability device 100. The additional aviation equipment can include any aviation equipment including drone equipment, a cockpit, a fuselage, a passenger cabin, a cargo compartment, jet engines, flaps, motors, propellers, canards, or any other equipment used in aviation.

Figure 7:
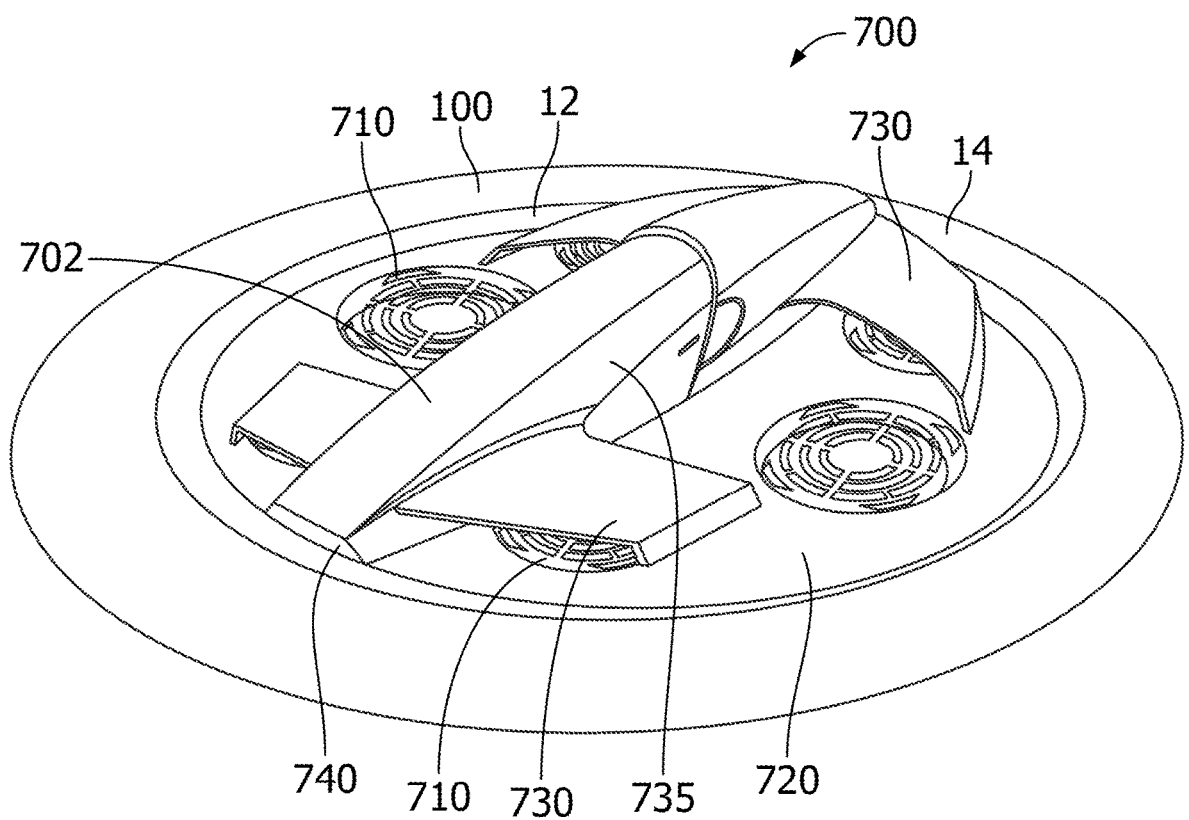
FIG. 7 illustrates an aircraft implementing the safety and stability device, according to an exemplary embodiment.

FIG. 7 illustrates an aircraft embodiment 700 implementing the safety and stability device 100 described above with reference to FIGS. 1-6. As shown in FIG. 7, the aircraft 702 fits within the hole created by the inner ring 12 (because the safety and stability device 100 lacks a hub). Moreover, the outer ring 14 rotates around the aircraft 702. In one embodiment, the aircraft 702 can include multiple propellers 710 all formed within the inner ring 12 of the safety and stability device 100. The number of propellers 710 can vary, with FIG. 7 illustrating a six-propeller embodiment, but other embodiments may have a single propeller, two propellers, four propellers, or any number of propellers. Each propeller may be associated with a respective motor driving the propeller. Additionally, the propellers 710 may increase rotation speed to increase the altitude of the drone embodiment 700, and the propellers 710 may decrease rotation speed to decrease the altitude of the drone embodiment 700. Also, in an embodiment, where the propellers 710 are used to turn the drone embodiment 700, the clockwise turning propellers may decrease in speed while the counterclockwise spinning propellers increase in speed 700 to turn the drone 700 to the left, whereas the counterclockwise propellers may decrease in speed while the clockwise propellers increase in speed 700 to turn the drone 700 to the right. In another embodiment, flaps on the wings or tailfin in conjunction with aircraft tilt may cause the drone embodiment 700 to turn left or right. In some embodiments, the aircraft 702 can comprise a drone, while in another embodiment, the aircraft 702 can comprise a human-piloted aircraft or an aircraft that carries and flies humans as a mode of transportation.

The aircraft 702 can further include a top disc 720 and a bottom disk (not shown), where the top and bottom disks 720 can have a radius substantially similar to the radius of the inner ring 12. In this way, the aircraft 702 can connect to the inner ring 12 of the safety and stability device 100. In some embodiments, the top and bottom disks 720 can be welded to the inner ring 12 or together form the inner ring 12, but other connection methods are contemplated, such as a removable and replaceable option to swap out one aircraft 702 for another. The propellers 710 can spin between the top and bottom disks 720, and the top and bottom disks 720 may include grills placed above and below each propeller 710.

Referring again to FIG. 7, the aircraft 702 can include a canard 730 acting as additional wings for flight control of the drone embodiment 700. As shown, the canard 730 can include a combination of front and rear wings, as is well-understood in the art of aviation. The canard 730 can connect to and extend outward from a main body 735, which can house important internal components, such as a fuel tank, a battery, a main computer, propeller motors, wireless connection with a control unit operated by a human to fly the drone, or any other internal component, as would be well-understood in the field of drone aviation.

In the embodiment shown in FIG. 7, flight can be controlled by the combination of the plurality of propellers 710, the canard 730, the safety and stability device 100, and propulsion engines 740. In this embodiment, the propulsion engines 740 can generate translational or forward movement of the aircraft, the plurality of propellers 710 can primarily provide the upward lift of the drone embodiment 700, the canard 730 can provide lift, control, and stability for the drone embodiment 700, and the safety and stability device 100 can provide stability, some lift, and aerodynamic benefits by cutting through the air at a high rate of speed, thereby decreasing the drag on the aircraft 702. In some embodiments, the propellers 710 may provide lift only until the canard 730 and the safety and stability device 100 are able to maintain lift alone, which may occur at high translational speeds resulting from propulsion provided by the propulsion engine 740, at which time the propellers may stop spinning at a high rate of speed. In some embodiments, the propulsion engines 740 may be omitted in favor of a drone embodiment 700 where the propellers 710 provide translational movement and lift. In yet another embodiment, the canard 730 and/or the propulsion engines 740 may be omitted. In other words, any drone configuration capable of connection to the safety and stability device 100 is envisioned.

Figure 8:
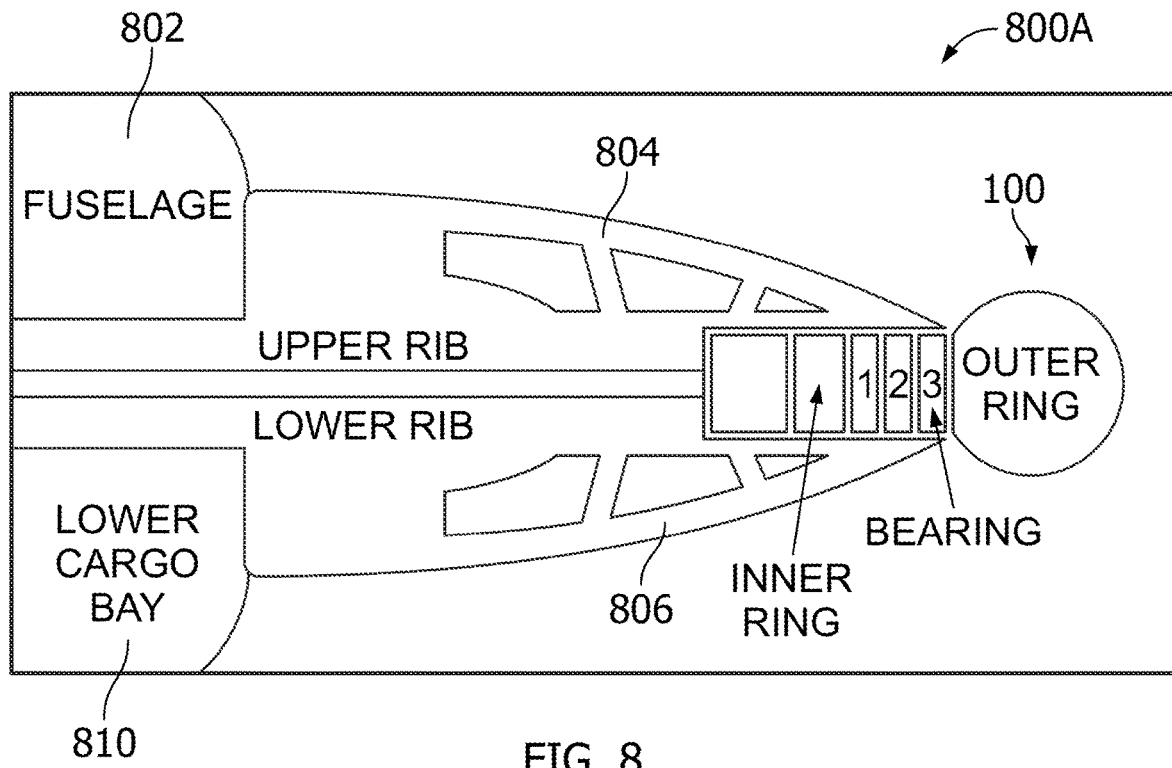
FIGS. 8 and 9 illustrate components for connecting a fuselage and other compartments to the safety and stability device, according to an exemplary embodiment.
Figure 9:
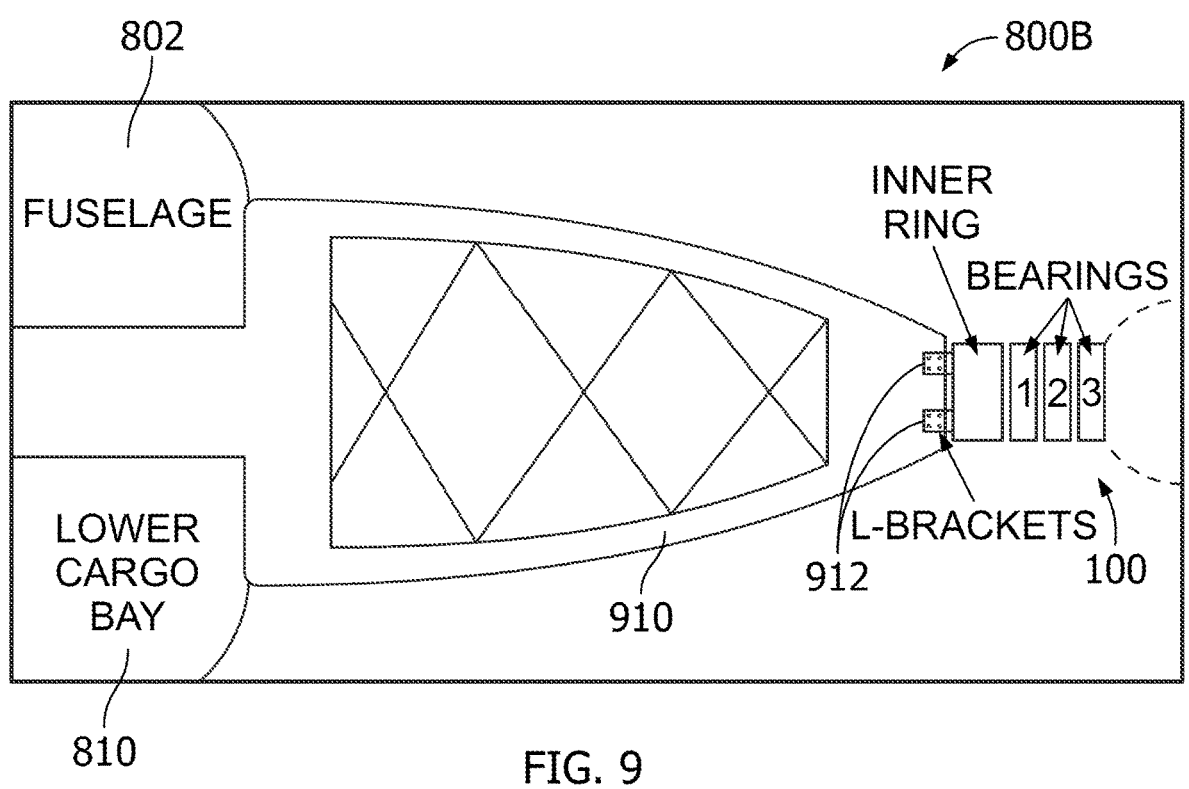

Referring now to FIGS. 8-9, FIGS. 8-9 illustrate a personal aircraft embodiment 800 configured for use with the safety and stability device 100. More particularly, FIGS. 8-9 illustrate components for connecting a fuselage and other compartments to the safety and stability device 100. In some embodiments, the personal aircraft embodiment 800 may operate similar to a personal helicopter for providing relatively short distance air travel. In this way, the personal aircraft embodiment 800 may include a main propeller and tail rotor for control, turning, and reactional torque to prevent spinning of the personal aircraft embodiment 800. The main propeller and rear rotor are not illustrated, as those features would be well-understood by those of skill in the art.

FIG. 8 illustrates a first personal aircraft embodiment 800A, where the safety and stability device 100 connects to a fuselage 802 via an upper rib 804 and a lower rib 806. FIG. 8 illustrates a cross-section of one upper rib 804 and one lower rib 806, but the first personal aircraft embodiment 800A may include multiple upper ribs 804 and multiple lower ribs 806 placed evenly around the safety and stability device 100. That is, the ribs 804, 806 may surround or encircle the fuselage 802 and connect to multiple points of the circular safety and security device 100. As shown in FIG. 8, the upper rib 804 and the lower rib 806 connect to the inner ring 12 and also surround the plurality of bearings 24, 26, 28, and the upper rib 804 and the lower rib 806 can also connect to the fuselage 802 and a lower cargo bay 810. In some embodiments, the fuselage may comprise a cockpit of the personal aircraft embodiment 800 where a human operator may sit and fly the personal aircraft embodiment 800. The upper rib 804 and the lower rib 806 may include holes for aerodynamic purposes to reduce drag during translational movement of the first personal aircraft embodiment 800A.

FIG. 9 illustrates a second personal aircraft embodiment 800B, where the safety and stability device 100 connects to a fuselage 802 via brackets 910. FIG. 9 illustrates a cross-section of one bracket 910, but the second personal aircraft embodiment 800B may include multiple brackets 910 placed evenly around the safety and stability device 100. That is, the brackets 910 may surround or encircle the fuselage 802 and connect to multiple points of the circular safety and security device 100. As shown in FIG. 9, the bracket 910 connects to the inner ring 12 and the fuselage 802 and a lower cargo bay 810. The bracket 910 may include a hole for aerodynamic purposes to reduce drag during translational movement of the personal aircraft embodiment, but the hole may further include cross bracing to increase the strength of the bracket 910. Additionally, the bracket 910 can include one or more L-brackets 912 that connect the inner ring 12 of the safety and stability device 100 to the bracket 910. While L-Brackets are shown in the embodiment shown in FIG. 9, any other connection mechanism are contemplated.

In either embodiment illustrated in FIGS. 8-9, the fuselage 802 may disconnect easily from the brackets 910 or the upper and lower ribs 804, 806 in the event of an emergency. By disconnecting the fuselage 802, the fuselage 802 may eject or fall from the rest of the aircraft, and the fuselage 802 may include a parachute to allow a safe landing of the fuselage 802.

Although the embodiments described in FIGS. 8-9 describe a personal aircraft, the embodiments described herein can increase in size by increasing the circumference of the safety and stability device 100 to allow for additional passengers. The exemplary embodiments described herein are not limited to a single seater aircraft.

As has been shown, the exemplary embodiments described herein illustrate an aircraft having a safety and stability device that surrounds an aircraft's fuselage for protection of the aircraft and stability of the aircraft. An aircraft having a rotating with can provide increased stability and protection, which may lower the learning curve necessary for more people to use air travel to travel shorter distances typically only available by automobile, bicycle or other short-distance travel options. Therefore, the aircraft having the rotational wing described herein represents a dramatic improvement over the prior art.

Although a few embodiments have been described in detail above, other modifications are possible. For example, other components may be added to or removed from the described systems, and other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A safety and stability device for an aircraft comprising:
an inner ring;
an outer ring that rotates relative to the inner ring;
a motor connected to the inner ring that drives rotation of the outer ring relative to the inner ring; and
a geared ring connected to the outer ring,
wherein the safety and stability device rotates in a substantially horizontal plane and at a rotational speed sufficient to provide gyroscopic stability for the aircraft.

2. The safety and stability device of claim 1 further comprising a plurality of bearings existing between the inner ring and the outer ring to decrease friction when the outer ring rotates relative to the inner ring.

3. The safety and stability device of claim 2 wherein each of the plurality of bearings comprises a ball, roller, or plain bearing.

4. The safety and stability device of claim 1 wherein the motor further comprises a gear that engages the geared ring and transmits rotational movement to the geared ring and thereby the outer ring.

5. The safety and stability device of claim 4 wherein the gear engages the geared ring through a hole formed in the inner ring.

6. The safety and stability device of claim 4 wherein the inner ring further comprises a pair of flanges holding an axle, and wherein the axle holds the gear and allows for rotational movement of the gear.

7. A safety and stability device for an aircraft comprising:
an inner ring;
an outer ring that rotates relative to the inner ring;
a motor connected to the inner ring that drives rotation of the outer ring relative to the inner ring,
wherein the safety and stability device rotates in a substantially horizontal plane and at a rotational speed sufficient to provide gyroscopic stability for the aircraft,
wherein the outer wheel comprises a soft material for absorbing any impact made with a structure, the soft material comprising an air-filled polymer, polyethene foam, or gel.

8. A safety and stability device for an aircraft comprising:
an inner ring;
an outer ring that rotates relative to the inner ring;
a motor connected to the inner ring that drives rotation of the outer ring relative to the inner ring,
wherein the safety and stability device rotates in a substantially horizontal plane and at a rotational speed sufficient to provide gyroscopic stability for the aircraft,
wherein the rotational speed sufficient to provide gyroscopic stability for the aircraft depends on readings from gyroscope sensors, and wherein the rotational speed sufficient to provide gyroscopic stability for the aircraft increases with an increase in the translational speed of the aircraft.

9. An aircraft comprising:
a safety and stability device comprising:
an inner ring;
an outer ring that rotates relative to the inner ring;
a motor connected to the inner ring that drives rotation of the outer ring relative to the inner ring; and
a geared ring connected to the outer ring,
wherein the safety and stability device rotates in a substantially horizontal plane and at a rotational speed sufficient to provide gyroscopic stability for the aircraft;
a fuselage connected to the inner ring.

10. The aircraft of claim 9, wherein the fuselage further comprises a cockpit.

11. The aircraft of claim 9 further comprising a plurality of bearings existing between the inner ring and the outer ring to decrease friction when the outer ring rotates relative to the inner ring.

12. The aircraft of claim 11 wherein each of the plurality of bearings comprises a ball, roller, or plain bearing.

13. The aircraft of claim 9 wherein the motor further comprises a gear that engages the geared ring and transmits rotational movement to the geared ring and thereby the outer ring.

14. The aircraft of claim 13 wherein the gear engages the geared ring through a hole formed in the inner ring.

15. The aircraft of claim 13 wherein the inner ring further comprises a pair of flanges holding an axle, and wherein the axle holds the gear and allows for rotational movement of the gear.

16. An aircraft comprising:
a safety and stability device comprising:
an inner ring;
an outer ring that rotates relative to the inner ring;
a motor connected to the inner ring that drives rotation of the outer ring relative to the inner ring,
wherein the safety and stability device rotates in a substantially horizontal plane and at a rotational speed sufficient to provide gyroscopic stability for the aircraft;
a fuselage connected to the inner ring, and
wherein the fuselage comprises a main body and a canard.

17. The aircraft of claim 16 further comprising a top plate connected to the inner ring and a bottom plate connected to an inner ring, wherein aviation equipment is formed between the top plate and the bottom plate.

18. The aircraft of claim 16 wherein the aviation equipment comprises propellers.

19. The aircraft of claim 17 An aircraft comprising:
a safety and stability device comprising:
an inner ring;
an outer ring that rotates relative to the inner ring;
a motor connected to the inner ring that drives rotation of the outer ring relative to the inner ring, wherein the safety and stability device rotates in a substantially horizontal plane and at a rotational speed sufficient to provide gyroscopic stability for the aircraft;

a fuselage connected to the inner ring; and at least one upper rib and a lower rib, wherein the upper rip is connected to the inner ring and the fuselage, and wherein the lower rib is connected to the inner ring and a cargo bay.

20. An aircraft comprising:

a safety and stability device comprising:

an inner ring;

an outer ring that rotates relative to the inner ring;

a motor connected to the inner ring that drives rotation of the outer ring relative to the inner ring, wherein the safety and stability device rotates in a substantially horizontal plane and at a rotational speed sufficient to provide gyroscopic stability for the aircraft a fuselage connected to the inner ring; and at least one bracket, wherein the bracket is connected to the inner ring and the fuselage.

21. An aircraft comprising:

a safety and stability device comprising:

an inner ring;

an outer ring that rotates relative to the inner ring;

a motor connected to the inner ring that drives rotation of the outer ring relative to the inner ring, wherein the safety and stability device rotates in a substantially horizontal plane and at a rotational speed sufficient to provide gyroscopic stability for the aircraft;

a fuselage connected to the inner ring; and propulsion engines to generate translational movement of the aircraft.

22. An aircraft comprising:

a safety and stability device comprising:

an inner ring;

an outer ring that rotates relative to the inner ring;

a motor connected to the inner ring that drives rotation of the outer ring relative to the inner ring, wherein the safety and stability device rotates in a substantially horizontal plane and at a rotational speed sufficient to provide gyroscopic stability for the aircraft;

a fuselage connected to the inner ring; and a propeller and a rear rotor.

23. An aircraft comprising:

a safety and stability device comprising:

an inner ring;

an outer ring that rotates relative to the inner ring;

a motor connected to the inner ring that drives rotation of the outer ring relative to the inner ring, wherein the safety and stability device rotates in a substantially horizontal plane and at a rotational speed sufficient to provide gyroscopic stability for the aircraft;

a fuselage connected to the inner ring, and wherein the outer wheel comprises a soft material for absorbing any impact made with a structure, the soft material comprising an air-filled polymer, polyethene foam, or gel.

24. An aircraft comprising:

a safety and stability device comprising:

an inner ring;

an outer ring that rotates relative to the inner ring;

a motor connected to the inner ring that drives rotation of the outer ring relative to the inner ring, wherein the safety and stability device rotates in a substantially horizontal plane and at a rotational speed sufficient to provide gyroscopic stability for the aircraft;

a fuselage connected to the inner ring, and wherein the rotational speed sufficient to provide gyroscopic stability for the aircraft depends on a translational speed of the aircraft, and wherein the rotational speed sufficient to provide gyroscopic stability for the aircraft increases with an increase in the translational speed of the aircraft.

25. An aircraft comprising:

a safety and stability device comprising:

an inner ring;

an outer ring that rotates relative to the inner ring;

a motor connected to the inner ring that drives rotation of the outer ring relative to the inner ring; and a geared ring connected to the outer ring, wherein the safety and stability device rotates in a substantially horizontal plane;

a fuselage connected to the inner ring.

* * * * *